(12) United States Patent
Yoshida et al.

(10) Patent No.: US 6,275,694 B1
(45) Date of Patent: *Aug. 14, 2001

(54) METHOD FOR REMOTELY UPDATING SOFTWARE CODE FOR PERSONAL HANDY PHONE SYSTEM EQUIPMENT

(75) Inventors: Satoshi Yoshida, Nice; Patrick Feyfant, Roulon; Varenka Martin; Laurent Winckel, both of Antibes; Philippe Gaglione, Mandelieu; Oliver Weigelt; Denis Archambaud, both of Antibes, all of (FR)

(73) Assignee: VLSI Technology, Inc., San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/994,248

(22) Filed: Dec. 19, 1997

(51) Int. Cl.[7] ................................................. H04M 3/00
(52) U.S. Cl. ............................................. 455/419; 455/88
(58) Field of Search ...................... 455/418, 419, 455/420, 88, 561, 426, 403, 462, 517, 352; 370/321, 337, 347

(56) References Cited

U.S. PATENT DOCUMENTS

| | | | |
|---|---|---|---|
| 5,109,403 | * | 4/1992 | Sutphin ............................. 455/419 |
| 5,884,148 | * | 3/1999 | Bilgic et al. ..................... 455/74.1 |

OTHER PUBLICATIONS

Association of Radio Industries and Businesses (ARIB), "Personal Handy Phone System ARIB Standard", version 2 RCR STD–28, Dec. 26, 1995.
Ministry of Posts and Telecommunications, Japan, "Personal Handy–Phone System (PHS) Guidebook", Japan.

* cited by examiner

*Primary Examiner*—Lee Nguyen
(74) *Attorney, Agent, or Firm*—Wagner, Murabito & Hao LLP

(57) ABSTRACT

A method for remotely updating software code of personal handy phone system equipment. The present invention enables a remotely located control terminal to update stored software code within a distant portable station or cell station of the personal handy phone system. Specifically, by coupling a control terminal to the existing communication network of a personal handy phone system, the control terminal is able to communicate with portable stations and cell stations. To update the software code of a specific portable station or cell station, the control terminal first establishes communication with that particular device by sending an unique preparatory signal addressed to it. The addressed device receives the unique preparatory signal and checks the validity of it. If the addressed device determines the unique preparatory signal is valid, it transmits a unique verification signal addressed to the control terminal indicating that it is ready to receive the updated version of the software code. Once the control terminal receives the unique verification signal from the particular portable station or cell station, it proceeds to download an updated version of software code into the flash memory of that device.

20 Claims, 5 Drawing Sheets

METHOD FOR REMOTELY UPDATING SOFTWARE CODE FOR PERSONAL HANDY PHONE SYSTEM EQUIPMENT

TECHNICAL FIELD

The present invention relates to the field of wireless telecommunications. More specifically, the present invention relates to the field of communication devices within the personal handy phone system.

BACKGROUND ART

Within the field of wireless telecommunications systems, there exists a system referred to as the personal handy phone system, otherwise known as PHS. Within the personal handy phone system, a user of a portable or personal station (PS) device is able to communicate with a user of another telecommunication device by way of a cell station (CS) device. In order for cell stations and portable station to communicate properly, software code is stored and utilized within both types of devices. From time to time, the need arises to update the stored software code within these devices. For instance, software bugs that exist within the stored software code can be corrected by updating the stored software code. Moreover, new and better software code created to improve the performance of portable stations and cell stations gives rise to updating the stored software code. Furthermore, the need may arise to increase or decrease the functionality of a customer's portable station by updating the stored software code.

There are different practices within the prior art for updating the software code stored within a portable station or a cell station of the personal handy phone system. One prior art updating practice involves an engineer or technician of a service provider physically exchanging the read only memory (ROM) chip located within a portable station or a cell station with a new ROM chip containing updated software code. Another prior art practice for updating software code stored within a portable station or a cell station software code involves a technician coupling a computer to the serial interface port of either device. The technician then commences to download the updated software code from the computer into the non-volatile random access memory (RAM) or the flash RAM of the portable station or cell station. Both of these prior art practices for updating software code within portable stations can either be accomplished by burdening each owner to bring their portable station to a central location or by having a technician visit each owner of a portable station. Conversely, to update software code within cell stations, a technician is burdened to visit each cell station wherever it is located.

The previously mentioned prior art practices for updating the software code stored within a portable station or a cell station have some disadvantages associated with them. One of the problems associated with the prior art practices for updating the software code within a portable station or a cell station is that it is a time consuming and burdensome process. Another problem associated with the prior art practices is that it is costly because a large number of technicians are needed to physically perform the updating of the software code within portable stations and cell stations.

Therefore it would be advantageous to provide a method within the personal handy phone system for remotely updating the software code stored within a portable station or a cell station. The present invention provides this advantage.

DISCLOSURE OF THE INVENTION

The present invention includes a method for remotely updating software code stored within personal handy phone system equipment. The present invention enables a remotely located control terminal to update stored software code within a distant portable station or cell station of the personal handy phone system. Specifically, by coupling a control terminal to the existing communication network of a personal handy phone system, the control terminal is able to communicate with portable stations and cell stations.

To update the software code of a specific portable station or cell station, the control terminal first establishes communication with that particular device by sending an unique preparatory signal addressed to it. The addressed device receives the unique preparatory signal and checks the validity of it. If the addressed device determines the unique preparatory signal is valid, it transmits a unique verification signal addressed to the control terminal indicating that it is ready to receive the updated version of the software code. Once the control terminal receives the unique verification signal from the particular portable station or cell station, it proceeds to download an updated version of software code into the flash memory of that device.

One present invention embodiment for remotely updating software code stored within a portable station is described below. A control terminal transmits a first signal to a cell station of the personal handy phone system using a network. In response to the first signal, the cell station transmits the first signal to the portable station of the personal handy phone system using a communication interface. In response to the first signal, the portable station determines if the first signal is valid. In response to the first signal being valid, the portable station transmits a second signal to the cell station using the communication interface.

In response to the second signal, the cell station transmits the second signal to the control terminal using the network. In response to the second signal, the control terminal transmits software code to the cell station using the network. In response to the software code, the cell station transmits the software code to the portable station using the communication interface. In response to the software code, the portable station stores the software code within memory.

One present invention embodiment for remotely updating software code stored within a cell station is described below. A control terminal transmits a first signal to a cell station of the personal handy phone system using a network. In response to the first signal, the cell station determines if the first signal is valid. In response to the first signal being valid, the cell station transmits a second signal to the control terminal using the network. In response to the second signal, the control terminal transmits software code to the cell station using the network. In response to the software code, the cell station stores the software code within memory.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

In the following detailed description of the present invention, a method within the personal handy phone system for remotely updating the software code stored within a portable station or a cell station, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to rib unnecessarily obscure aspects of the present invention.

The present invention operates within the communication system known as the personal handy phone system which provides its users wireless voice communication. Along with providing its users wireless voice communication, the personal handy phone system also provides facsimile (fax) and multimedia communication capabilities. The personal handy phone system has the ability to operate both indoors and outdoors, which offers greater communication opportunities. For instance, the indoor operations include using it within office spaces, homes, hotels, shopping malls and airports. Furthermore, the outdoor operations of the personal handy phone system include using it within rural, suburban, and city areas. The personal handy phone system is well known by those skilled in the art, and is discussed in a number of publications, such as Personal Handy-Phone System (PHS) Guidebook by the Ministry of Posts & Telecommunications, Japan (1995) and Personal Handy Phone System ARIB Standard Version 2 by the Association of Radio Industries and Businesses, (1995).

Figure 1:
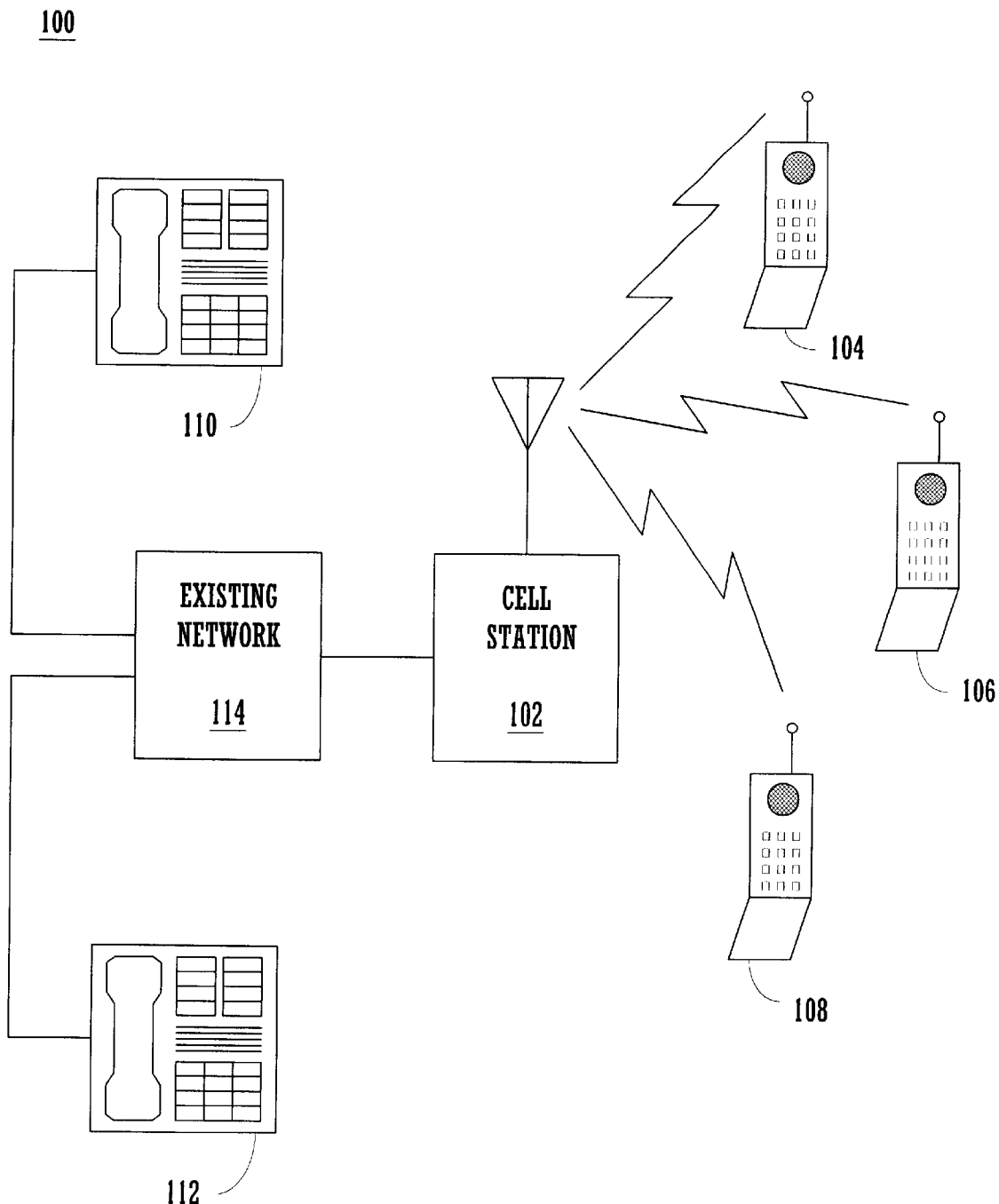
FIG. 1 illustrates a general overview of the personal handy phone system in which the present invention operates.

FIG. 1 illustrates a general overview of the personal handy phone system 100 in which the present invention operates. The two main components that comprise the personal handy phone system are a cell station (CS) device and a personal or portable station (PS) device. Referring to FIG. 1, portable stations 104–108 are similar in function to cordless telephone handsets and have the ability to transmit and receive voice information along with other types of data. Cell station 102 is a transmitter and receiver base station which can be implemented by coupling it into an existing network 114, such as a public telephone network. Implemented in this way, cell station 102 enables the users of portable stations 104–108 to communicate with each other and with the users of telephones 110 and 112, which are coupled by wire to the existing network 114. The information that is communicated between cell station 102 and portable stations 104–108 is the same type of information (e.g., voice/data etc.) that can normally be transferred and received over a public telephone wire network system. Instead of communicating over a wire network, the personal handy phone system uses a wireless digital radio interface to communicate information between cell station 102 and portable stations 104–108. One embodiment of the digital radio interface used by the personal handy phone system 100 is a time division multiple access capability with time division duplexing (TDMA-TDD).

Figure 2:
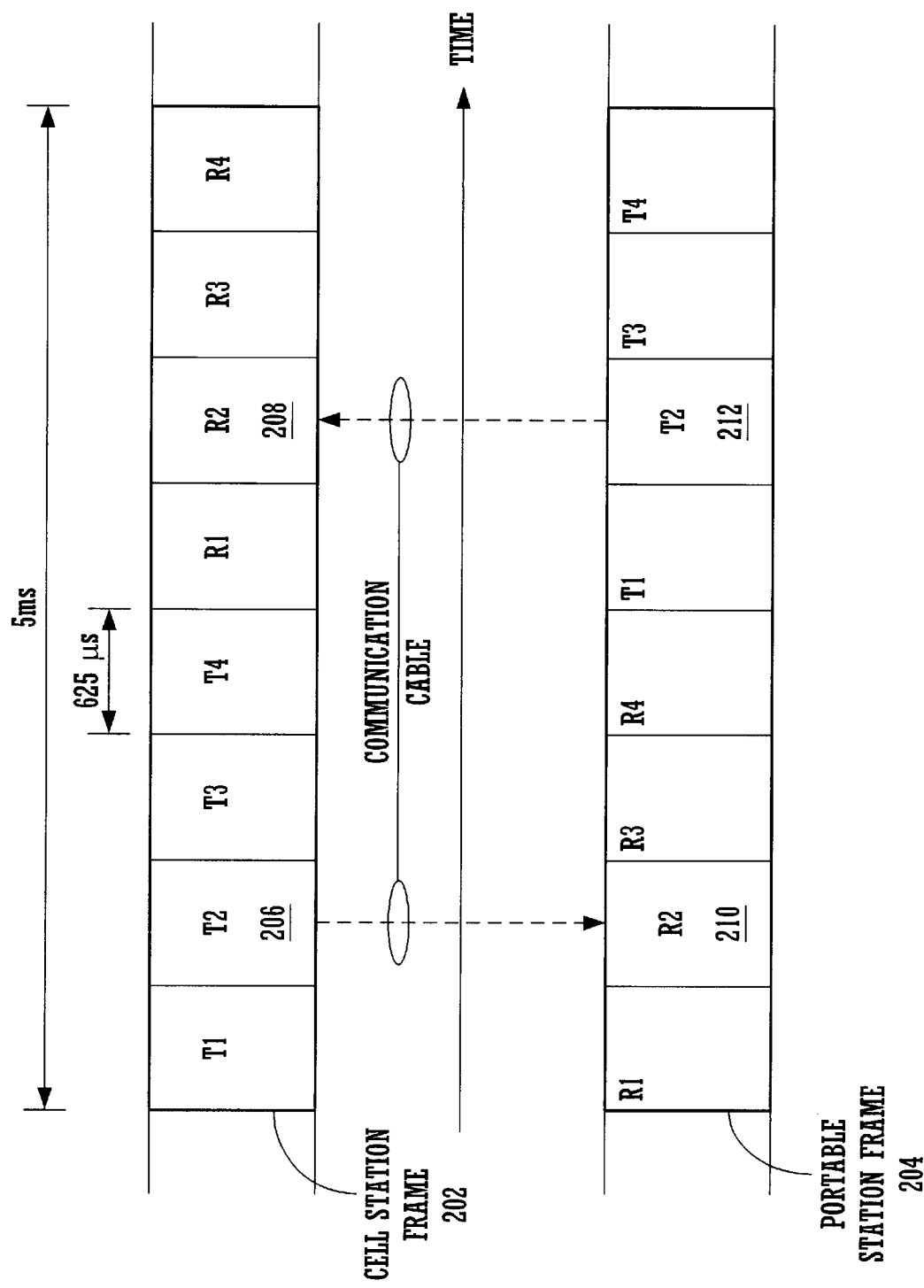
FIG. 2 illustrates one embodiment of time division duplexed communication frames used within the personal handy phone system as a digital radio interface between cell stations and portable stations.

FIG. 2 illustrates time division duplexed frames 202 and 204, which can be used within personal handy phone system 100 of FIG. 1 as the digital radio interface between cell station 102 and multiple portable stations 104–108. Frames 202 and 204 each have a time interval of 5 milliseconds which is divided into eight communication slots, four slots for receiving data (R1, R2, R3, R4) and four slots for transmitting data (T1, T2, T3, T4). Each communication slot within frames 202 and 204 has a time interval of 625 microseconds. Cell station 102 is able to use all the receiving slots and transmitting slots of cell station frame 202 in order to simultaneously communicate with four portable stations. Conversely, portable station 104 only utilizes one receiving slot (e.g., slot 210) and one transmitting slot (e.g., slot 212) of portable station frame 204 when it communicates with cell station 102. For example, data transmitted by cell station 102 to portable station 104 during slot 206, the second transmitting slot of frame 202, is received within corresponding slot 210, the second receiving slot of frame 204. Data transmitted by portable station 104 to cell station 102 during slot 212, the second transmitting slot of frame 204, is received within corresponding slot 208, the second receiving slot of frame 202. In this manner, an independent communication channel is established between portable station 104 and cell station 102 for the duration of the communication session. Therefore, cell station frame 202 allows up to four logical channels of simultaneous communication, e.g., between cell station 102 and four portable stations.

Figure 3:
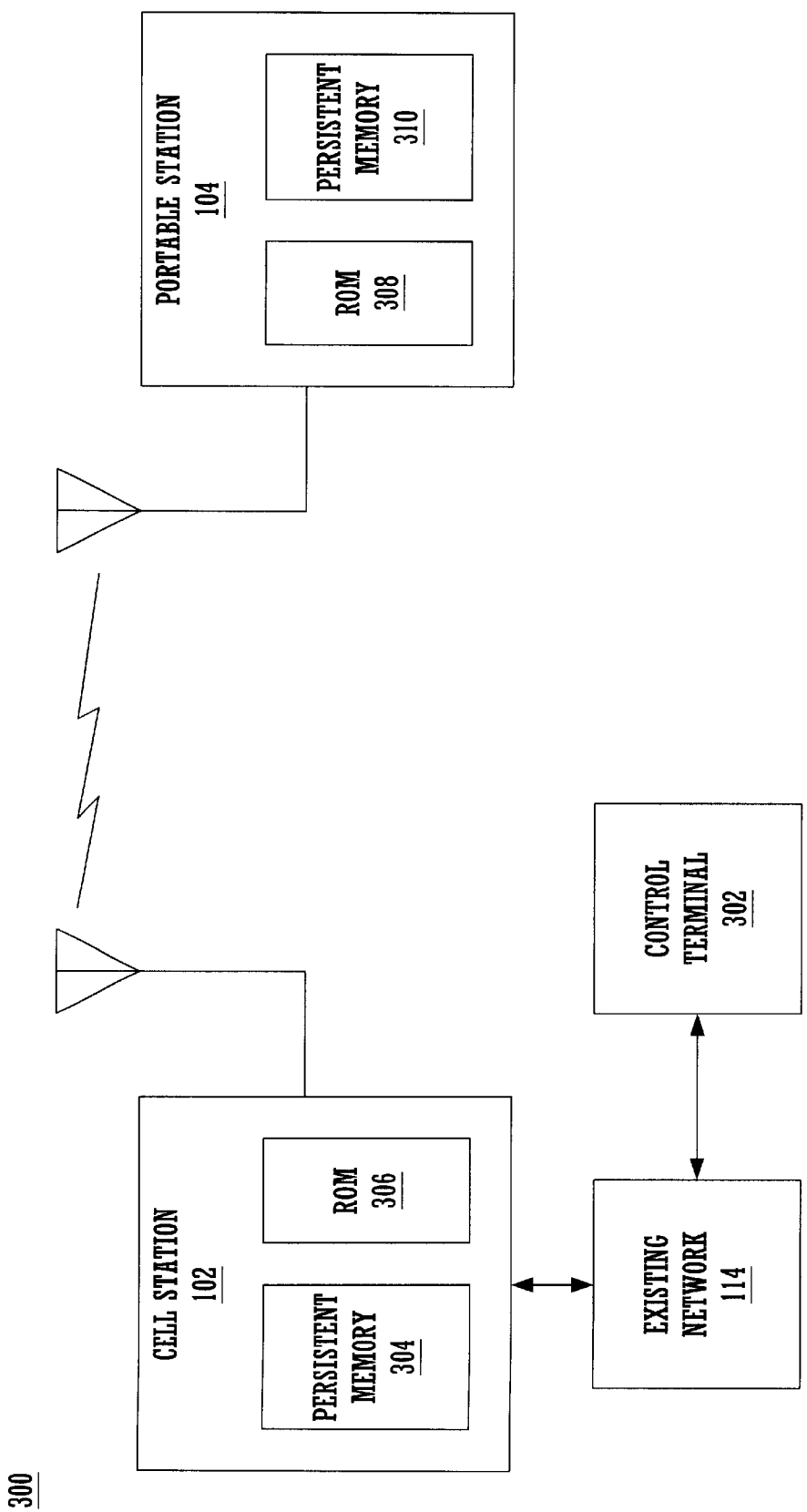
FIG. 3 illustrates an embodiment of the present invention for remotely updating the software code stored within personal handy phone system equipment.

FIG. 3 illustrates an embodiment of the present invention for remotely updating the software code stored within portable station 104 or cell station 102 of the personal handy phone system 300. Within an embodiment of the present invention, portable station 104 contains two different types of memory devices. Portable station 104 contains read only memory (ROM) 308 which stores special software code enabling portions of the present invention to operate properly, while persistent memory 310 stores application software code that can be remotely updated by the present invention. Within another embodiment of the present invention, cell station 102 contains two different types of memory devices. Cell station 102 contains read only memory (ROM) 306 and persistent memory 304, which are utilized by the present invention in the same manner as described above for portable station 104. Persistent memories 304 and 310 allow the reprogramming of part or all of either memory space by using control and write orders from a microprocessor (not shown) that resides within portable station 104 and cell station 102. One embodiment of persistent memories 304 and 310 within the present invention are non-volatile random access memory (RAM) or flash memory. Non-volatile RAM is a more persistent RAM that does not lose information when it is powered down.

In order to communicate, cell station 102 of FIG. 3 and control terminal 302 are each coupled to the existing network 114. One embodiment of the existing network 114 of the present invention is the public services telephone network (PSTN) or the integrated services digital network (ISDN). One present invention embodiment of control terminal 302 is any type of computer system (e.g., personal computer or mainframe computer). Within an embodiment of the present invention, control terminal 302 is utilized by a technician of a service provider to remotely update the application software code stored within persistent memory 310, which is located within portable station 104. Within another embodiment of the present invention, control terminal 302 is utilized by a technician to remotely update the application software code stored within persistent memory 304 located within cell station 102.

Figure 4:
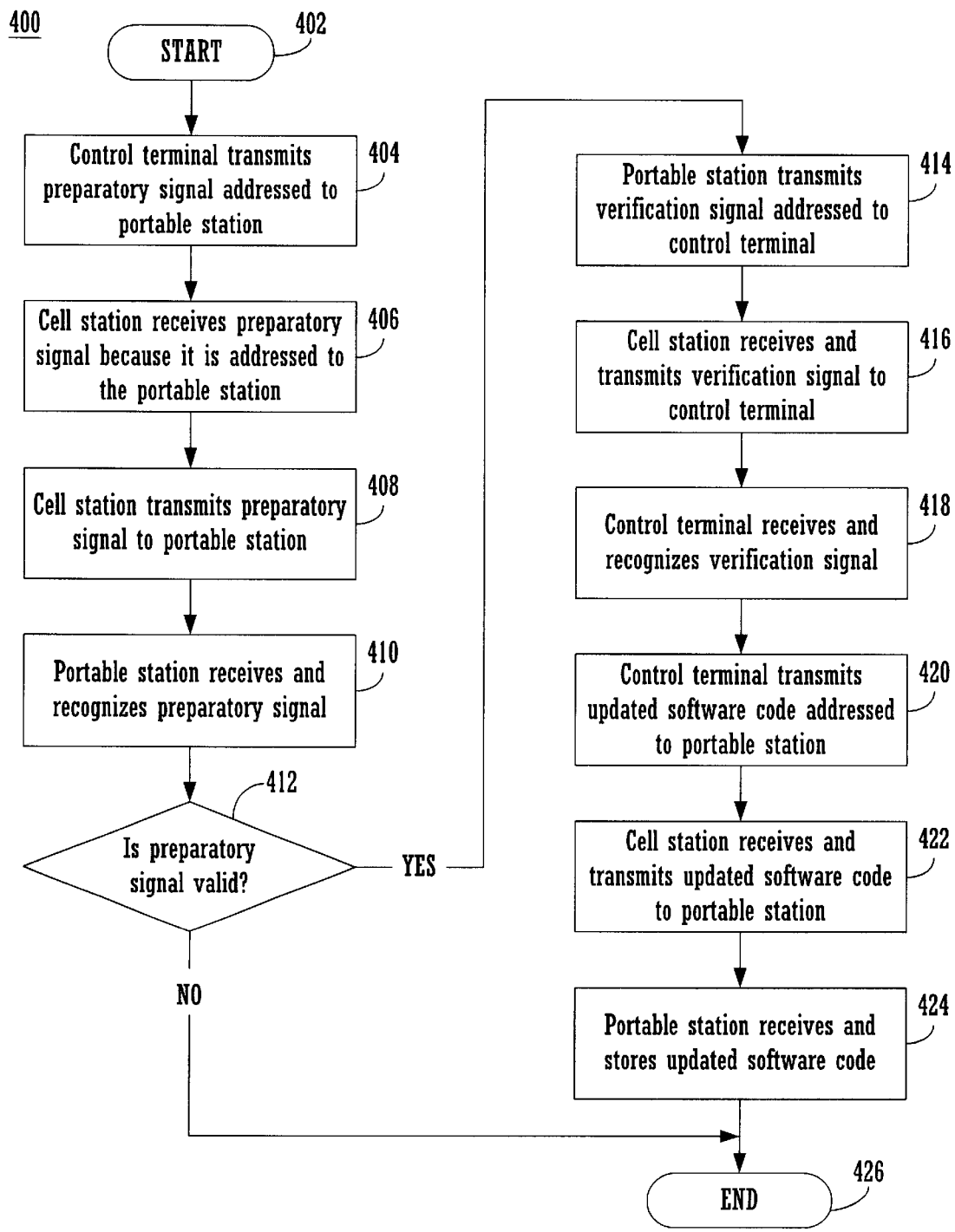
FIG. 4 shows a flowchart of one embodiment of the present invention within the personal handy phone system for remotely updating the software code stored within a portable station.

FIG. 4 shows a flowchart of one embodiment of the present invention within the personal handy phone system 300 of FIG. 3 for remotely updating the application software code stored within the persistent memory 310 of portable station 104. FIG. 4 contains process 400 which starts at step 402. Step 404 directs control terminal 302 to transmit a unique preparatory signal addressed to portable station 104 via the existing network 114. Step 406 directs cell station 102 to receive the transmitted unique preparatory signal because it is addressed to portable station 104. Step 408 directs cell station 102 to transmit the unique preparatory signal to portable station 104.

Once step 408 is completed, step 410 of FIG. 4 directs portable station 104 of FIG. 3 to receive the transmitted unique preparatory signal which is addressed to it. At step 410, special software code stored within ROM 308 recognizes the received unique preparatory signal as a precursor signal indicating that the software code stored within persistent memory 310 is going to be updated. Step 412 directs portable station 104 to determine if the received unique preparatory signal is valid. One embodiment of the present invention for determining the validity of the received preparatory signal is to compare it with a valid preparatory signal stored within ROM 308. At step 412, if portable station 104 determines that the received unique preparatory signal is not valid, portable station 104, cell station 102 and control terminal 302 are directed to proceed to step 426 to exit process 400. At step 412, if portable station 104 determines that the received unique preparatory signal is valid, portable station 104 is directed to proceed to step 414.

Once step 412 is completed, step 414 of FIG. 4 directs portable station 104 of FIG. 3 to transmit a unique verification signal addressed to control terminal 302 indicating that portable station 104 is ready to receive the updated software code. Step 416 directs cell station 102 to receive the unique verification signal and transmit it to control terminal 302 via the existing network 114. Step 418 directs control terminal 302 to receive the unique verification signal which is addressed to it. At step 418, control terminal 302 recognizes the unique verification signal as an indication that portable station 104 is ready to receive the updated software code.

Once step 418 is completed, step 420 of FIG. 4 directs control terminal 302 of FIG. 3 to transmit updated software code addressed to portable station 104 via the existing network 114. Step 422 directs cell station 102 to receive the updated software code and transmit it to portable station 104. Step 424 directs portable station 104 to receive the updated software code which is addressed to it. At step 424, portable station is directed to store the received updated software code within persistent memory 310. Portable station 104, cell station 102 and control terminal 302 exit process 400 at step 426.

Figure 5:
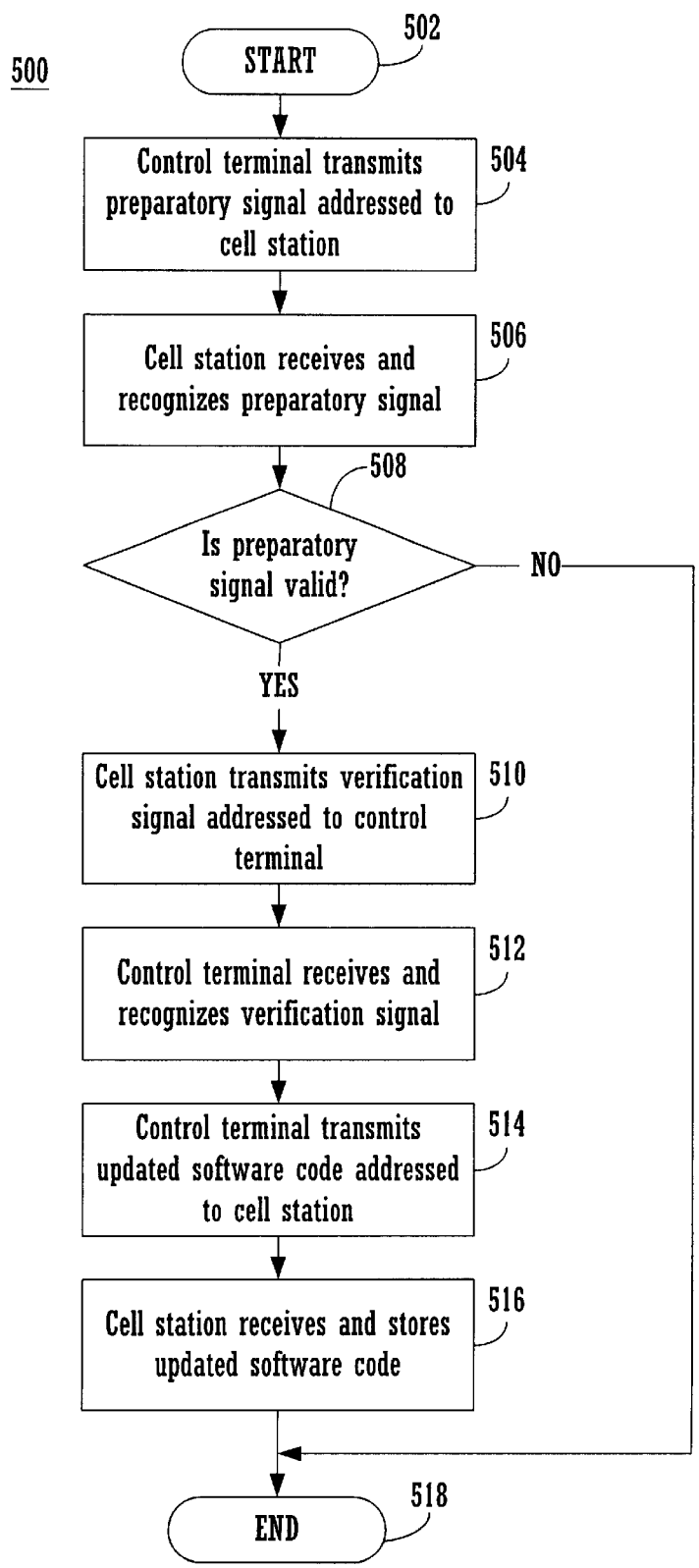
FIG. 5 shows a flowchart of one embodiment of the present invention within the personal handy phone system for remotely updating the software code stored within a cell station.

FIG. 5 shows a flowchart of one embodiment of the present invention within the personal handy phone system 300 of FIG. 3 for remotely updating the application software code stored within the persistent memory 304 of cell station 102. FIG. 5 contains process 500 which starts at step 502. Step 504 directs control terminal 302 to transmit a unique preparatory signal addressed to cell station 102 via the existing network 114. Step 506 directs cell station 102 to receive the transmitted unique preparatory signal which is addressed to it. At step 506, special software code stored within ROM 306 recognizes the received unique preparatory signal as a precursor signal indicating that the software code stored within persistent memory 310 is going to be updated.

Once step 506 is completed, step 508 of FIG. 5 directs cell station 102 of FIG. 3 to determine if the received unique preparatory signal is valid. One embodiment of the present invention for determining the validity of the received preparatory signal is to compare it with a valid preparatory signal stored within ROM 306. At step 508, if cell station 102 determines that the received unique preparatory signal is not valid, cell station 102 and control terminal 302 are directed to proceed to step 518 to exit process 500. At step 508, if cell station 102 determines that the received unique preparatory signal is valid, cell station 102 is directed to proceed to step 510.

Once step 508 is completed, step 510 of FIG. 5 directs cell station 102 of FIG. 3 to transmit, via the existing network 114, a unique verification signal addressed to control terminal 302 indicating that cell station 102 is ready to receive the updated software code. Step 512 directs control terminal 302 to receive the unique verification signal which is addressed to it. At step 512, control terminal 302 recognizes the unique verification signal as an indication that cell station 102 is ready to receive the updated software code.

Once step 512 is completed, step 514 of FIG. 5 directs control terminal 302 of FIG. 3 to transmit updated software code addressed to cell station 102 via the existing network 114. Step 516 directs cell station 102 to receive the updated software code which is addressed to it. At step 516, cell station 102 is directed to store the received updated software code within persistent memory 304. Cell station 102 and control terminal 302 exit process 500 at step 518.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method within a personal handy phone system for remotely updating software code stored within a portable station, said method comprising the steps of:

a) a control terminal transmitting a unique preparatory signal to a cell station of said personal handy phone system (PHS), wherein said unique preparatory signal is a precursor signal indicating that software code stored by said portable station is going to be updated;

b) in response to receiving said unique preparatory signal, said cell station transmitting said unique preparatory signal to said portable station of said personal handy phone system using a wireless digital radio interface having a time division multiple access capability having frames that are time division duplexed wherein a single frame contains eight communication slots;

c) in response to receiving said unique preparatory signal, said portable station determining if said unique preparatory signal is valid;

d) in response to said unique preparatory signal being valid, said portable station transmitting a unique verification signal to said cell station using said wireless digital radio interface, wherein said unique verification signal indicates that said portable station is ready to receive updated software code;

e) in response to receiving said unique verification signal, said cell station transmitting said unique verification signal to said control terminal;

f) in response to receiving said unique verification signal, said control terminal transmitting said updated software code to said cell station;

g) in response to receiving said updated software code, said cell station transmitting said updated software code to said portable station using said wireless digital radio interface; and h) in response to receiving said updated software code, said portable station storing said updated software code within a computer readable memory.

2. A method as described in claim 1 wherein said control terminal comprises a computer and said computer readable memory comprises non-volatile random access memory (RAM).

3. A method as described in claim 1 wherein said single frame comprises 5 milliseconds.

4. A method as described in claim 3 wherein said updated software code comprises an updated version of software code used for controlling the functionality of said portable station.

5. A method as described in claim 4 wherein said step c) of determining if said preparatory signal is valid comprises the step of comparing said preparatory signal to a stored valid preparatory signal.

6. A method as described in claim 5 wherein said computer readable memory comprises non-volatile random access memory (RAM).

7. A method as described in claim 5 wherein said computer readable memory comprises flash memory.

8. A method within a personal handy phone system for remotely updating software code stored within a portable station, said method comprising the steps of:

a) a control terminal transmitting a unique preparatory signal to a cell station of said personal handy phone system (PHS) using an integrated services digital network (ISDN), wherein said unique preparatory signal is a precursor signal indicating that software code stored by said portable station is going to be updated;

b) in response to receiving said unique preparatory signal, said cell station transmitting said unique preparatory signal to said portable station of said personal handy phone system using a wireless digital radio interface having a time division multiple access capability having frames that are time division duplexed wherein a single frame contains eight communication slots;

c) in response to receiving said unique preparatory signal, said portable station determining if said unique preparatory signal is valid;

d) in response to said unique preparatory signal being valid, said portable station transmitting a unique verification signal to said cell station using said wireless digital radio interface, wherein said unique verification signal indicates that said portable station is ready to receive updated software code;

e) in response to receiving said unique verification signal, said cell station transmitting said unique verification signal to said control terminal using said integrated services digital network (ISDN);

f) in response to receiving said unique verification signal, said control terminal transmitting said updated software code to said cell station using said integrated services digital network (ISDN);

g) in response to receiving said updated software code, said cell station transmitting said updated software code to said portable station using said wireless digital radio interface; and h) in response to receiving said updated software code, said portable station storing said updated software code within a computer readable memory.

9. A method as described in claim 8 wherein said single frame comprises 5 milliseconds.

10. A method as described in claim 9 wherein said computer readable memory comprises non-volatile random access memory (RAM).

11. A method as described in claim 9 wherein said computer readable memory comprises flash memory.

12. A method as described in claim 9 wherein said updated software code comprises an updated version of software code used for controlling the functionality of said portable station.

13. A method as described in claim 12 wherein said step c) of determining if said preparatory signal is valid comprises the step of comparing said preparatory signal to a stored valid preparatory signal.

14. A method as described in claim 13 wherein said control terminal comprises a computer and said computer readable memory comprises non-volatile random access memory (RAM).

15. A method as described in claim 13 wherein said computer readable memory comprises flash memory.

16. A method within a personal handy phone system for remotely updating software code stored within a cell station, said method comprising the steps of:

a) a control terminal transmitting a unique preparatory signal to a cell station of said personal handy phone system (PHS) using a network, wherein said unique preparatory signal is a precursor signal indicating that software code stored by said cell station is going to be updated;

b) in response to receiving said unique preparatory signal, said cell station determining if said unique preparatory signal is valid;

c) in response to said unique preparatory signal being valid, said cell station transmitting a unique verification signal to said control terminal using said network, wherein said unique verification signal indicates that said cell station is ready to receive updated software code;

d) in response to receiving said unique verification signal, said control terminal transmitting said updated software code to said cell station using said network; and e) in response to receiving said updated software code, said cell station storing said updated software code within a computer readable memory.

17. A method as described in claim 16 wherein said step c) of determining if said preparatory signal is valid comprises the step of comparing said preparatory signal to a stored valid preparatory signal.

18. A method as described in claim 17 wherein said updated software code comprises an updated version of software code used for controlling the functionality of said cell station and said control terminal comprises a computer system.

19. A method as described in claim 18 wherein said network comprises a public services telephone network (PSTN) and said computer readable memory comprises non-volatile random access memory (RAM).

20. A method as described in claim 18 wherein said network comprises an integrated services digital network (ISDN) and said computer readable memory comprises flash memory.

* * * * *